United States Patent
Beaume et al.

(10) Patent No.: US 10,988,581 B2
(45) Date of Patent: Apr. 27, 2021

(54) POROUS FILMS OBTAINED FROM POLYMER LATEX

(71) Applicants: ARKEMA FRANCE, Colombes (FR); CENTRE NATIONAL DE LA RECHERCHE SCIENTIFIQUE, Paris (FR); UNIVERSITE DE MONTPELLIER, Montpellier (FR); ECOLE NATIONALE SUPERIEURE DE CHIMIE DE MONTPELLIER, Montpellier (FR)

(72) Inventors: Francois Beaume, Saint Genis Laval (FR); Andre Deratani, Castelnau le Lez (FR); Damien Quemener, Montpellier (FR); Mona Semsarilar, Montpellier (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/082,314

(22) PCT Filed: Feb. 27, 2017

(86) PCT No.: PCT/FR2017/050431
§ 371 (c)(1),
(2) Date: Sep. 5, 2018

(87) PCT Pub. No.: WO2017/153663
PCT Pub. Date: Sep. 14, 2017

(65) Prior Publication Data
US 2019/0077923 A1    Mar. 14, 2019

(30) Foreign Application Priority Data
Mar. 8, 2016 (FR) .................................. 1651911

(51) Int. Cl.
| | | |
|---|---|---|
| *B01D 71/34* | (2006.01) | |
| *B01D 71/80* | (2006.01) | |
| *B01D 67/00* | (2006.01) | |
| *C08L 53/00* | (2006.01) | |
| *C08F 6/12* | (2006.01) | |
| *C08J 3/07* | (2006.01) | |
| *C08F 293/00* | (2006.01) | |
| *C08G 81/02* | (2006.01) | |
| *C08J 5/18* | (2006.01) | |
| *B01D 69/14* | (2006.01) | |
| *C08J 3/00* | (2006.01) | |
| *C08F 299/04* | (2006.01) | |
| *B01D 71/40* | (2006.01) | |

(52) U.S. Cl.
CPC ........ *C08G 81/027* (2013.01); *B01D 67/0011* (2013.01); *B01D 69/141* (2013.01); *B01D 71/34* (2013.01); *B01D 71/80* (2013.01); *C08F 6/12* (2013.01); *C08F 293/005* (2013.01); *C08F 299/0492* (2013.01); *C08G 81/022* (2013.01); *C08J 3/005* (2013.01); *C08J 3/07* (2013.01); *C08J 5/18* (2013.01); *C08L 53/00* (2013.01); *B01D 71/40* (2013.01); *B01D 2323/12* (2013.01); *B01D 2325/02* (2013.01); *C08F 2438/03* (2013.01); *C08J 2353/00* (2013.01); *C08J 2353/02* (2013.01); *C08J 2427/16* (2013.01)

(58) Field of Classification Search
CPC ...... B01D 71/80; B01D 2325/02; C08L 53/00
See application file for complete search history.

(56) References Cited

U.S. PATENT DOCUMENTS

| | | |
|---|---|---|
| 5,563,204 A | 10/1996 | Speth et al. |
| 5,578,674 A | 11/1996 | Speth et al. |
| 5,905,097 A | 5/1999 | Walther |
| 9,707,524 B2 | 7/2017 | Kosar et al. |
| 2007/0141340 A1 | 6/2007 | Song |
| 2014/0087142 A1* | 3/2014 | Nealey .................. B01D 69/10 428/172 |
| 2014/0217012 A1* | 8/2014 | Wiesner ................ B01D 69/02 210/500.22 |
| 2015/0043241 A1* | 2/2015 | Deshazer .............. G02B 1/046 362/558 |
| 2016/0030896 A1 | 2/2016 | Lorian et al. |

FOREIGN PATENT DOCUMENTS

| | | | |
|---|---|---|---|
| FR | 2937644 A1 | | 4/2010 |
| WO | WO 94/15997 | * | 7/1994 |

* cited by examiner

*Primary Examiner* — Jeffrey C Mullis
(74) *Attorney, Agent, or Firm* — Joanne Rossi

(57) ABSTRACT

The invention relates to a porous material comprising particles of polymer P assembled by a block copolymer, said block copolymer comprising at least one block consisting of a polymer sequence immiscible with polymer P, and at least two blocks consisting of polymer sequences which are miscible with polymer P. The invention also relates to films produced with this material.

21 Claims, No Drawings

POROUS FILMS OBTAINED FROM POLYMER LATEX

This application claims benefit, under 35 U.S.C. § 119 or § 365 of PCT to Application Number PCT/FR2017/050431, filed February the PCT application is incorporated herein by reference.

FIELD OF THE INVENTION

The present invention relates to a porous material prepared from a polymer latex, and also to films and other articles formed with this material, and to a process for producing said material.

TECHNICAL BACKGROUND

A nanometric-scale organization of the active layer of filtration membranes is increasingly sought in order to better control their selectivity while at the same time maintaining great permeability.

Polyvinylidene fluoride (PVDF) is a polymer of choice for producing such membranes, owing in particular to its good mechanical strength and its resistance to chemical attacks.

Since PVDF is hydrophobic, it offers a high water resistance. For this reason, document WO 2010/051150 describes polymer membranes consisting of a PVDF-based polymer matrix, blended with an amphiphilic block copolymer, in order to increase the hydrophilic nature of the matrix. In this document, the PVDF is intimately blended with the block copolymer.

Document WO 2014/139977 describes an improved version of this technology, in which use is made of particular block copolymers comprising a hydrophilic first block which can be obtained from n-butyl acrylate and hydroxyethyl methacrylate monomers, and a hydrophobic second block of poly(methyl methacrylate) type.

There is still a need to provide a material which makes it possible to produce membranes having a precise and uniform pore size, where appropriate with a desired surface functionalization. There is also a need to reduce the amount of solvents consumed during the production of such a material. There is also a need to be able to apply such a material to various supports.

SUMMARY OF THE INVENTION

The invention relates firstly to a material comprising particles of polymer P assembled by a block copolymer, the block copolymer comprising at least one block consisting of a polymer sequence immiscible with the polymer P, and at least two blocks consisting of polymer sequences miscible with the polymer P.

According to one embodiment, the diameter Dv50 of the particles of polymer P is from 30 to 1000 nm, preferably from 50 to 400 nm and more particularly preferably from 100 to 200 nm.

According to one embodiment, the block copolymer is a triblock copolymer of general formula ABA, in which A represents a block consisting of a sequence miscible with the polymer P, and B represents a block consisting of a polymer sequence immiscible with the polymer P.

According to one embodiment:
the block A consists of the same repeating unit(s) as the polymer P; and/or the block A is a homopolymer or copolymer sequence, chosen from methacrylic polyesters, acrylic polyesters, polyvinylpyrrolidone, polyether glycols, polystyrenes, polylactic acids or polybutadienes; and/or
the block B is a homopolymer or copolymer sequence chosen from acrylic or methacrylic polymers, polyvinyl polymers, polystyrene sulfonates, polyether glycols and cellulose-based polymers.

According to one embodiment, the block A and the block B are acrylic or methacrylic homopolymer or copolymer sequences; the block A preferably being a poly(methyl methacrylate) block; and the block B preferably being a poly(2-(dimethylamino)ethyl methacrylate) block.

According to one embodiment, the polymer P is chosen from fluoropolymers, polysulfones, polyethersulfones, polyimides, polyetherimides, polyamide-imides, polyacrylonitriles, polyolefins and in particular polyethylene, polyvinyl chlorides, polyacrylates and polymethacrylates, polystyrenes and natural or synthetic rubbers; preferably, the polymer P is a homopolymer or copolymer formed from vinylidene fluoride; and more particularly preferably, the polymer P is a polyvinylidene fluoride homopolymer.

According to one embodiment, the material has:
a weight content of block copolymer ranging from 1% to 60%, preferably from 10% to 50%, more particularly preferably from 30% to 50%; and/or
a weight content of polymer P ranging from 40% to 99%, preferably from 50% to 90%, more particularly preferably from 50% to 70%.

According to one embodiment, the block copolymer comprises:
a weight content of blocks consisting of polymer sequences miscible with the polymer P ranging from 10% to 90%, preferably from 40% to 80%, more particularly preferably from 60% to 75%; and/or
a weight content of blocks consisting of polymer sequences immiscible with the polymer P ranging from 10% to 90%, preferably from 20% to 60%, more particularly preferably from 25% to 40%.

The invention also relates to a film comprising at least one layer of the material above.

According to one embodiment, the film is a membrane, preferably a filtration membrane.

According to one embodiment, the film constitutes a coating deposited on a substrate, the substrate preferably being a filtration membrane or a support which is woven or nonwoven.

The invention also relates to processes for producing the material above, or the film above.

According to a first embodiment, said production process comprises the following steps:
provision of a suspension of particles of polymer P (particle latex);
provision of the block copolymer;
blending of the suspension of particles of polymer P and of the block copolymer, in the presence of a solvent;
drying of this blend.

In this first case, the latex of particles of polymer P is pre-existing.

According to a second embodiment, said process for producing the material according to the invention comprises the following steps:
provision of a solution of polymer P;
provision of a block copolymer;
precipitation of the blend of a solution of polymer P and of the block copolymer in water, in the presence of a solvent, resulting in the obtaining of the latex;
drying of this blend.

In this second case, a latex is produced in situ by means of the precipitation of the blend of polymer P and of block copolymer in solution, in a solvent.

According to one embodiment, the block copolymer is provided in solution in the solvent.

The solvent used to place the blend (polymer P+block copolymer) in suspension (according to the first embodiment described), or to precipitate the blend (polymer P+block copolymer) (according to the second embodiment described) must be capable of:
dissolving the block copolymer,
for the first case, producing swelling of the polymer P and/or dissolution thereof, and
for the second case, dissolving the polymer P.

According to one embodiment, said solvent is chosen from ethers, ketones, aromatic solvents, alcohols or esters, and preferably is chosen from acetone and tetrahydrofuran.

Examples of a solvent capable of producing swelling of the polymer P and/or dissolution thereof, suitable for the first embodiment, are: acetone, tetrahydrofuran (THF), N,N-dimethylformamide (DMF).

Acetone and DMF are particularly suitable as solvents for the precipitation of the blend of polymer P with the block copolymer, required for the second embodiment.

According to one embodiment, the process comprises spreading the blend over a surface before the drying step.

The present invention meets the needs expressed above. It more particularly provides a material which makes it possible to produce membranes having a precise and uniform pore size, where appropriate with a desired surface functionalization. Advantageously, the amount of solvents consumed during the production of such a material is reduced compared with the prior art. The material according to the invention can be plated-out on various supports.

These various advantages are obtained by assembling together polymer particles (such as PVDF particles) derived from a latex in order to form a network of particles. The stabilization and the cohesion of the particles are obtained by linking them via a block copolymer. Thus, it is possible to prepare mechanically and chemically stable active layers which have a desired pore size and distribution. Such layers have water-permeability and selectivity properties suitable for their use for filtration applications in particular.

DESCRIPTION OF EMBODIMENTS OF THE INVENTION

The invention is now described in greater detail and in a nonlimiting manner in the description which follows.

The material of the invention can be prepared by blending a latex of a polymer P with a block copolymer.

The term "latex" is intended to mean suspension of polymer particles in a non-solvent.

The polymer P can in particular be chosen from fluoropolymers, polyethersulfones, polyimides, polyetherimides, polyamide-imides, polyacrylonitriles, polyolefins and in particular polyethylene, polyvinyl chlorides, polyacrylates and polymethacrylates, polystyrenes and natural or synthetic rubbers.

In one preferred embodiment, the polymer P is a fluoropolymer, that is to say a polymer comprising fluorine substituents. Particularly preferably, it is polyvinylidene fluoride (PVDF). PVDF homopolymer is preferred and can be obtained for example according to the process described in document WO 2005/121290. However, use may also be made of a copolymer derived from PVDF. Such copolymers are obtained by copolymerization of vinylidene fluoride (VDF) with at least one other comonomer which is advantageously chosen from chlorotrifluoroethylene (CTFE), hexafluoropropylene (HFP), trifluoroethylene (TrFE), tetrafluoroethylene (TFE) and ethylene. Several comonomers can optionally be used. Advantageously, said copolymer contains at least 75% by weight of units resulting from the VDF comonomer, preferably at least 80%, or even at least 85%. Another possible fluoropolymer is polytetrafluoroethylene (PTFE).

In one preferred embodiment, a single polymer P is present in the particles. However, it is also possible to envision that the particles are formed from a polymer blend. In this case, the references in the present application to the polymer P are understood as a reference to the polymer blend. For each of these cases, it is possible to use blends having identical or different particle sizes. Thus, with a blend comprising different particle sizes, it is possible to obtain a more compact assembly of the polymer balls in the final film or membrane (the smallest balls lodging in the interstices between the larger balls).

The non-solvent of the latex is preferably water.

The particle size distribution of the latex suspension is preferably characterized by a diameter Dv50 which is from 30 nm to 1 μm, preferably from 50 to 400 nm and more particularly preferably from 100 to 200 nm.

The term Dv50 denotes the 50th percentile of the particle size distribution, that is to say that 50% of the particles have a size less than the Dv50 and 50% have a size greater than the Dv50. It is the median of the volumetric distribution of the particles. The Dv50 of the latex particles can be estimated by quasi-elastic light scattering analysis.

The particle size can be chosen as a function of the porosity which is desired for the material of the invention.

The latexes can be obtained according to document WO 2005/121290, or prepared by precipitation of a blend of polymer P and of the block copolymer.

The block copolymer comprises at least one block consisting of a polymer sequence immiscible with the polymer P, and at least two blocks consisting of polymer sequences miscible with the polymer P.

The expression "polymer sequence miscible with the polymer P" is intended to mean a polymer sequence capable of homogeneously blending with the polymer, after dissolution in an appropriate solvent and drying. A polymer sequence immiscible with the polymer P is a polymer sequence which is not miscible with the polymer P, that is to say of which any blend with the polymer P is necessarily a two-phase blend.

One possible method for determining the homogeneous or non-homogeneous nature of a blend of two polymers (and therefore for determining the miscibility or the immiscibility of two polymers) consists in carrying out a glass transition temperature measurement on the blend, for example by differential scanning calorimetry (DSC) according to the standard ASTM E1356. If a single glass transition temperature is obtained, the blend analyzed is homogeneous, and the polymers are miscible. If two glass transition temperatures are obtained, the blend analyzed is heterogeneous, and the polymers are immiscible.

In the block copolymer of the invention, the blocks consisting of a polymer sequence miscible with the polymer P are preferably extremal blocks.

A particularly preferred block copolymer is a triblock copolymer of general formula ABA, in which A represents a block consisting of a polymer sequence miscible with the polymer P, and B represents a block consisting of a polymer sequence immiscible with the polymer P.

The block A is a polymer sequence which may be homopolymer or copolymer. The block A may for example be a block consisting of the same repeating unit(s) as the polymer P; in this case, the block A is chosen from fluoropolymers, polysulfones, polyethersulfones, polyimides, polyetherimides, polyamide-imides, polyacrylonitriles, polyolefins and in particular polyethylene, polyvinyl chlorides, polyacrylates and polymethacrylates, polystyrenes and natural or synthetic rubbers.

The block A may also be a sequence of methacrylic polyester, of acrylic polyester, of polyvinylpyrrolidone, of polyether glycol, of polystyrene, of polylactic acid or of polybutadiene.

In one preferred embodiment, the block A is a poly (methyl methacrylate) (PMMA) block.

Preferably, the number-average molar mass of the block A is from 1000 to 50 000 g/mol, and more particularly preferably from 3000 to 20 000 g/mol. A molar mass that is too low could limit the solid entangling of the block A with the polymer P, whereas a molar mass that is too high could limit the mobility of the block.

The block B is a polymer sequence which may be homopolymer or copolymer. The block B can for example be chosen from acrylic or methacrylic polymers, polyvinyl polymers, in particular polyvinylpyrrolidones, polyvinyl pyridines, polyvinyl alcohols, polystyrene sulfonates, polyether glycols and cellulose-based polymers.

In one preferred embodiment, the block B is a poly(2-(dimethylamino)ethyl methacrylate) (PDMAEMA) block.

Preferably, the number-average molar mass of the block B is from 1000 to 50 000 g/mol, and more particularly preferably from 3000 to 20 000 g/mol.

In one embodiment, the block B is hydrophilic. This characteristic is particularly advantageous for applications in which water or aqueous solutions are filtered.

In one alternative embodiment, the block B is hydrophobic. This characteristic is particularly advantageous for the production of superhydrophobic materials.

The block B can also be functionalized according to the desired application for the material of the invention, for example for capturing metals by virtue of the presence of chelating and/or complexing groups.

According to one embodiment, the weight content of blocks A in the block copolymer is from 10% to 90%, preferably from 40% to 80%, more particularly preferably from 60% to 75%.

According to one embodiment, the weight content of blocks B in the block copolymer is from 10% to 90%, preferably from 20% to 60%, more particularly preferably from 25% to 40%.

The block copolymer is blended with the latex of polymer P in the presence of a solvent. The solvent must be suitable for at least partially dissolving the polymer P (and also the blocks of the block copolymer which are miscible with said polymer P).

The choice of the solvent therefore depends on the nature of the polymer P.

The solvent may in particular be chosen from ethers, ketones, aromatic solvents, alcohols or esters.

When the polymer P is PVDF, acetone and tetrahydrofuran (THF) are particularly preferred solvents.

The block copolymer can advantageously be dissolved in the solvent, and this solution can be blended with the latex of polymer P. Alternatively, the latex of polymer P can be combined with the solvent, then the block copolymer can be dissolved in this mixture.

According to another embodiment, the latex can be prepared directly from the blend of polymer P and block copolymer in solution in an aprotic polar solvent such as N,N-dimethylformamide (DMF). This blend is precipitated with stirring with an ultrasonic homogenizer so as to obtain a dispersion of particles with a size distribution as previously indicated.

According to particular embodiments, the material comprises respectively weight contents of, on the one hand, block copolymer and, on the other hand, of polymer B: of from 1% to 10% and from 90% to 99%; or from 10% to 20% and from 80% to 90%; or from 20% to 30% and from 70% to 80%; or from 30% to 40% and from 60% to 70%; or from 40% to 50% and from 50% to 60%; or from 50% to 60% and from 40% to 50%; or from 60% to 70% and from 30% to 40%; or from 70% to 80% and from 20% to 30%; or from 80% to 90% and from 10% to 20%.

After the blending of the components, the solvent (and also the non-solvent of the latex) are evaporated off. The porous material according to the invention, consisting of the particles of polymer P assembled by the block copolymer, is thus obtained. The pores of the material are the interstices left after the evaporation of the solvent between the particles of polymer P, which are linked to one another by the block copolymer. This granular structure can be identified in particular by scanning electron microscopy or by atomic force microscopy. Under these conditions, a variety of morphologies such as: sphere stacking (FIGS. 2A, 2B, 2G, 2H), assemblies of discrete or coalesced spherical particles (FIGS. 2C and 2D), or honeycomb structures organized as a bees nest-like structure on a macrovoid structure (FIGS. 2F and 2E) are observed.

The particle size distribution of polymer P in the material, which can be estimated by the above microscopy techniques, is preferably characterized by a Dv50 having the same values as those stated above in relation to the latex.

The material according to the invention can in particular be made into the form of a film.

For this, it is possible to apply the blend of particles of polymer P and of block copolymers in solution to a substrate and to evaporate off the solvent and the non-solvent.

The film can then be detached from the substrate. It can thus in particular be used as a membrane (for example a filtration membrane) as such. For example, if the substrate is hydrophilic, such as a plate of glass, it is possible to immerse the film plated out and the substrate in an aqueous solution, in order to facilitate the detachment of the film from the substrate.

Alternatively, if it is sought to produce a granular layer on a support, the film can be formed directly on said support. This method is for example useful for forming a layer of material of the invention on a filtration membrane (in particular a microfiltration or ultrafiltration membrane). Woven or non-woven materials can also be used as supports.

The material of the invention can also be used as a lubricating layer, a self-cleaning layer and anti-soiling layer or an anti-fogging layer on various supports, or else as a layer for improving the adhesion of a coating for paints and other surface treatments.

According to one preferred embodiment, the average porosity of the material (as determined by scanning electron microscopy) is from 1 to 100 nm, preferably from 5 to 50 nm.

EXAMPLES

The following examples illustrate the invention without limiting it.

Example 1—Synthesis of a Block Copolymer

In this example, a triblock copolymer comprising PMMA end blocks and a PDMAEMA central block is prepared.

RAFT polymerization (controlled reversible addition-fragmentation chain transfer radical polymerization) is used to prepare this triblock copolymer.

Firstly, a difunctional RAFT agent is synthesized in two steps according to the reaction scheme below:

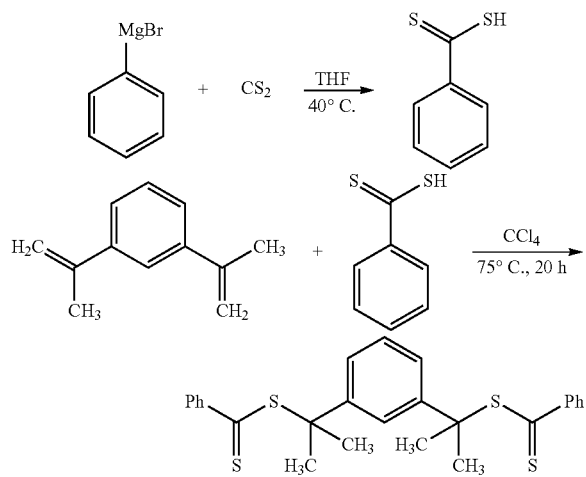

Once purified and characterized, the difunctional RAFT agent is used in the polymerization of the hydrophilic central block (starting from the DMAEMA monomer) in a first step, followed by the polymerization of the PMMA end blocks. The scheme for preparing this PMMA-b-PDMAEMA-b-PMMA block copolymer is represented below:

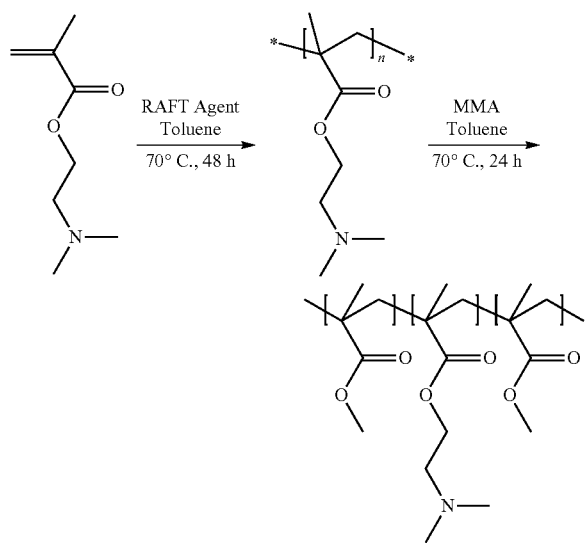

The triblock copolymer, after precipitation from hexane, is characterized by size exclusion chromatography in tetrahydrofuran (determination of the number-average $M_n$ and weight-average $M_w$ molar masses and the polydispersity index PDI). The degree of polymerization DP is calculated according to the analysis of the end groups by proton NMR. The results obtained are collated in table I below:

TABLE I

| | $M_n$ (g/mol) | $M_w$ (g/mol) | PDI | DP |
|---|---|---|---|---|
| PDMAEMA | 14 800 | 19 600 | 1.32 | 93 (DMAEMA) |
| PMMA-b-PDMAEMA-b-PMMA | 23 500 | 31 900 | 1.35 | 100 (MMA) |

Example 2—Production of Membranes from Latex Prepared According to Document WO 2005/121290

A suspension of PVDF particles (latex) has an average latex particle size of 150 nm, by quasi-elastic light scattering determination in solution. This latex comprises 28% by weight of PVDF.

0.5 g of PVDF latex at 28% by weight is blended directly with 1.4 g of a solution of triblock copolymer of example 1 in a solvent (10% by weight).

The solvent used is either acetone, THF or DMF.

After stirring for 24 h in a hermetically closed container, an amount of water is added with sonication in order to adjust the final concentration of the solution. The acetone is then entirely evaporated off with simple magnetic stirring so as to solidly anchor the copolymer to the particles.

The particles obtained are analyzed by quasi-elastic light scattering before the production of the membrane. A doubling of the latex particle size is observed owing to the swelling in the presence of the solvent.

The mixture is then plated out on a glass plate and immersed in water. A layer a few microns thick is obtained.

Three different concentrations of latex (4%, 5% and 7.7% by weight) are tested for the preparation of the membranes. The concentration in question corresponds to the amount of solids (polymer and triblock copolymer) in the solution plated out (water, after evaporation of a volume corresponding to the fraction of acetone or other solvent).

The membranes obtained are analyzed by scanning electron microscopy and atomic force microscopy (AFM). A return to the original size of the latex particles (approximately 150 nm) is observed after washing of the membranes and drying. Furthermore, the AFM image shows that the membranes prepared have a surface that is not very rough (the difference between the high point and the low point is equal to approximately half the particle height) and a compact arrangement.

The membranes obtained by varying the concentration have the same profile by scanning electron microscopy observation, but different mechanical properties. Increasing the latex concentration from 4% to 7.7% results in an apparent improvement of the mechanical properties, in particular the stretching resistance and the compressive strength, measured by rheological analysis and by dynamic mechanical analysis of the materials.

Example 3—Production of a Latex of PVDF Particles Stabilized by a Block Copolymer, Prepared by Precipitation A suspension of PVDF particles is prepared from dilute solutions (1% and 2% by weight) of Kynar 761 or 720E in DMF (solution A). A solution B consisting of a dilute mixture (1% by weight) of block copolymer of example 1, in the same solvent, is then mixed with solution A in a proportion of 1 volume per volume. The mixture (solution C) is left to stir at 70° C. for approximately 15 h and then precipitated in the form of fine particles using an ultrasonic homogenizer brought to its maximum power, in a water bath at pH 3 containing variable amounts of acetone of from 12.5% to 50% by volume (solution D). A stable suspension is obtained after exchange of the acetone/water mixture with pure water. The values of the PVDF particle size analyzed by quasi-elastic light scattering are indicated in table II below.

TABLE II

| Suspension | PVDF grade | [PVDF] (Solution A) (% by weight) | [Acetone] (Solution D) (% by volume) | Particle size (nm) |
|---|---|---|---|---|
| 1 | 761 | 1 | 37.5 | 375 |
| 2 | 761 | 2 | 37.5 | 222 |
| 3 | 761 | 1 | 12.5 | 563 |
| 4 | 720E | 2 | 12.5 | 417 |

Example 4—Production of Membranes from Latex Prepared According to Example 3

The latex prepared according to example 3 is spread on a plate of glass and the same procedure as that presented in example 2 is applied starting from this step. The membranes obtained are observed under a scanning electron microscope A decrease in the particle size is observed after drying, as in the case of example 2. A variety of morphologies can be obtained, such as sphere stacking, beads of coalesced spheres, and a honeycomb surface organized as a bees nest-like structure on a macrovoid structure.

Example 5—Filtration Tests

Preliminary pure water filtration tests were carried out with the membrane of example 2 prepared from a solution containing 7.7% by weight of latex, with acetone as solvent. The membrane, 25 mm in diameter and 25 μm thick, supported on a polyester non-woven, is placed in a frontal filtration module with a volume of 10 ml.

The membrane is conditioned under a pressure of 0.2 bar for 1 hour. After this conditioning step, the pressure is increased in increments of 0.5 bar up to 5 bar. For each pressure, the flow rate, which is expressed in $l/h.m^2$, is noted.

The results obtained are collated. The curve of water flow rate as a function of applied pressure (A) shows a break of the slope at around 3 bar. Above this value, it is observed that the flow increases much more rapidly than below it.

The variation in the hydraulic permeability (in $l/h.m^2.bar$) is represented in B. it is generally an intrinsic parameter of a material, that is to say that it virtually does not vary with the pressure and is characteristic of the pore size and of the porosity.

In point of fact, for the membrane tested, it is observed that this parameter decreases down to approximately 2 bar then increases above 3 bar, with a transient range between 2 and 3 bar.

Without wanting to be bound by any theory, the inventors consider that this variation can be interpreted as a variation in the pore diameter and in the porosity of the material under the pressure applied. The first part of the curve appears to correspond to a crushing of the material with a corresponding decrease of the pore diameter. Above a critical pressure, a rearrangement of the particles appears to take place which appears to increase the porosity and the pore diameter.

Thus, it is possible to adjust the porosity of the membrane as a function of the pressure applied.

The invention claimed is:

1. A porous material comprising particles of polymer P assembled by a block copolymer, the block copolymer comprising at least one block consisting of a polymer sequence immiscible with the polymer P, and at least two blocks consisting of polymer sequences miscible with the polymer P,
   wherein the block copolymer is a triblock copolymer of general formula ABA, in which A represents a block consisting of a polymer sequence miscible with the polymer P, and B represents a block consisting of a polymer sequence immiscible with the polymer P, and
   wherein Polymer P comprises a fluoropolymer.

2. The material as claimed in claim 1, wherein the diameter Dv50 of the particles of polymer P is from 30 to 1000 nm.

3. The material as claimed in claim 1, wherein:
   the block A consists of the same repeating unit(s) as the polymer P; or the block A is a homopolymer or copolymer block, selected from the group consisting of methacrylic polyesters, acrylic polyesters, polyvinylpyrrolidone, polyether glycols, polystyrenes, polylactic acids or polybutadienes; and/or
   the block B is a homopolymer or copolymer sequence selected from the group consisting of acrylic or methacrylic polymers, polyvinyl polymers, polystyrene sulfonates, polyether glycols and cellulose-based polymers.

4. The material as claimed in claim 1, wherein the block A and the block B are acrylic or methacrylic homopolymer or copolymer sequences; the block A being a poly(methyl methacrylate) block; and the block B being a poly(2-(dimethylamino)ethyl methacrylate) block.

5. The material as claimed in claim 1, having:
   a weight content of block copolymer ranging from 1% to 60% and/or
   a weight content of polymer P ranging from 40% to 99%.

6. The material as claimed in claim 1, wherein the block copolymer comprises:
   a weight content of blocks consisting of polymer sequences miscible with the polymer P ranging from 10% to 90% and/or
   a weight content of blocks consisting of polymer sequences immiscible with the polymer P ranging from 10% to 90%.

7. The material as claimed in claim 1, wherein the particles of polymer P are linked to one another by said block copolymer.

8. A film comprising at least one layer of material as claimed in claim 1.

9. The film as claimed in claim 8, wherein said film is a membrane, or a filtration membrane.

10. The film as claimed in claim 8, consisting of a coating deposited on a substrate, the substrate being a filtration membrane or a support which is woven or nonwoven.

11. A process for producing the material as claimed in claim 1, comprising:
   providing a suspension of particles of polymer P;
   providing said block copolymer;
   blending the suspension of particles and of the block copolymer, in the presence of a solvent; and drying of this blend,
wherein polymer P comprises a fluoropolymer.

12. The process as claimed in claim 11, wherein the block copolymer is provided in solution in the solvent.

13. A process for producing the material as claimed in claim 1 in latex form, comprising:
providing a solution of polymer P;
providing the block copolymer;
precipitating a blend of polymer P and of block copolymer in water, in the presence of a solvent, resulting in the obtaining of the latex; and
drying of this latex.

14. The process as claimed in claim 11, further comprising spreading the blend over a surface before the drying step.

15. The process as claimed in claim 11, wherein the solvent is selected from the group consisting of ethers, ketones, aromatic solvents, alcohols, esters, acetone and tetrahydrofuran.

16. The process as claimed in claim 11, wherein the material obtained is in the form of a film or membrane and the morphology of the films or membranes obtained consists of an assembly of discrete or coalesced particles.

17. The process as claimed in claim 11, wherein the material obtained is in the form of a film or membrane and the morphology of the films or membranes obtained consists of a honeycomb structure organized as a bees nest-like structure.

18. The material as claimed in claim 1, wherein the fluoropolymer comprises at least 75% by weight of units of vinylidene fluoride monomer.

19. The material as claimed in claim 18, wherein the fluoropolymer comprises vinylidene fluoride homopolymer.

20. The material as claimed in claim 1, wherein the fluoropolymer comprises a copolymer of vinylidene fluoride with a least one other comonomer selected from the group consisting of chlorotrifluoroethylene (CTFE), hexafluoropropylene (HFP), trifluoroethylene (TrFE), tetrafluoroethylene (TFE) and ethylene.

21. The material as claimed in claim 1, wherein the fluoropolymer comprises polytetrafluoroethylene (PTFE).

* * * * *